United States Patent [19]

Hasegawa et al.

[11] Patent Number: 5,319,503
[45] Date of Patent: Jun. 7, 1994

[54] METHOD AND APPARATUS FOR WRITING SUCCESSIVE STREAMS OF DATA ON A MAGNETIC MEDIUM BY WRITING A CANCEL MARK INDICATING THE CANCELLATION OF A PREVIOUSLY-WRITTEN FILE MARK

[75] Inventors: Mitsuru Hasegawa, Komae; Shuichi Saito, Tachikawa, both of Japan

[73] Assignee: Teac Corporation, Tokyo, Japan

[21] Appl. No.: 644,521

[22] Filed: Jan. 22, 1991

[30] Foreign Application Priority Data

Jan. 26, 1990 [JP] Japan .................................. 2-16344

[51] Int. Cl.⁵ .......................... G11B 5/09; G11B 5/02
[52] U.S. Cl. .................................. 360/48; 360/27
[58] Field of Search .................. 360/27, 32, 46, 48, 360/50

[56] References Cited

U.S. PATENT DOCUMENTS

| | | | |
|---|---|---|---|
| 4,541,019 | 9/1985 | Precourt | 360/48 |
| 4,873,589 | 10/1989 | Inazawa et al. | 360/32 |
| 4,899,232 | 2/1990 | Odaka et al. | 360/48 |

*Primary Examiner*—Donald Hajec
*Assistant Examiner*—Won Tae C. Kim
*Attorney, Agent, or Firm*—Woodcock Washburn Kurtz Mackiewicz & Norris

[57] ABSTRACT

A writing method suitable for practice with magnetic tape cassettes in particular. After writing a first stream of file data on the tape in the form of a series of file data blocks, there is created one or more, preferably two, file mark blocks immediately after the last file data block. Then, in writing a second stream of file data on a blank tape length left after the first file data stream, at least one file mark cancel mark block is created after the file mark blocks, instead of the conventional practice of overwriting the first block of the second file data stream on the second file mark block following the first file data stream. Then the second stream of file data is written in the form of another series of file data blocks after the cancel mark block. The first and second streams of file data can be subsequently read one after the other.

4 Claims, 4 Drawing Sheets

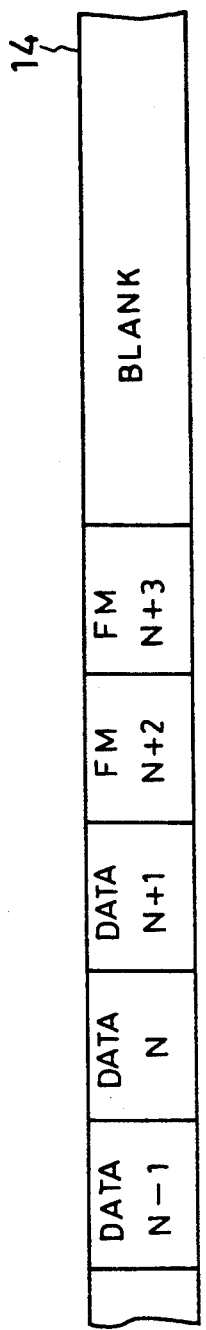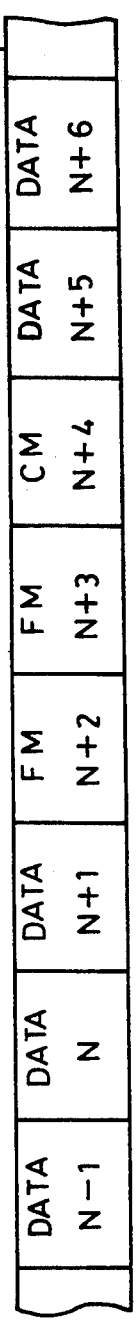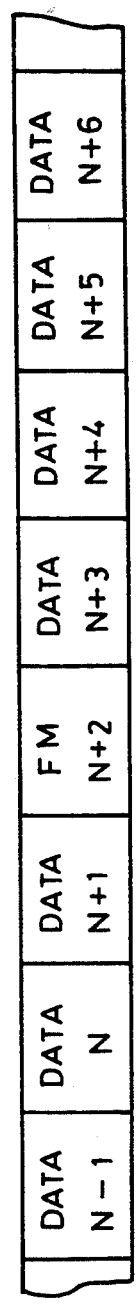
FIG. 2A PRIOR ART
FIG. 2B
FIG. 3 PRIOR ART

METHOD AND APPARATUS FOR WRITING SUCCESSIVE STREAMS OF DATA ON A MAGNETIC MEDIUM BY WRITING A CANCEL MARK INDICATING THE CANCELLATION OF A PREVIOUSLY-WRITTEN FILE MARK

BACKGROUND OF THE INVENTION

Our invention relates to a method of writing one stream of digital data after another on magnetic tape or other record media. The writing method of our invention is of particular utility in conjunction with magnetic tape packaged in cassette form, although we do not wish our invention to be limited to this particular application.

Magnetic tape finds extensive use as a data storage medium of electronic computer systems. Usually, a stream of file data is written in the form of a series of data blocks on a length of magnetic tape. Then two consecutive file mark blocks are created immediately after the last of the series of data blocks. When the tape is read subsequently, the two consecutive file marks serve to inform the host system of the end of one file data stream, and of the fact that the remaining tape length is blank. Thus the unnecessary scanning of the unrecorded tape length is avoided.

In writing another stream of file data on the remaining blank tape length, the usual conventional practice with magnetic tape of the open reel type has been to overwrite the first block of the second file data stream on the second of the two consecutive file mark blocks. Then the second and all the subsequent data blocks of the second file data stream has been created after the first block (FIG. 3). The remaining one file mark between the two file data streams has been used as a demarcation therebetween. The single file mark has enabled the two file data streams to be read continuously.

We object to this conventional practice of overwriting the first block of the second file data stream on the second of the two file mark blocks following the first file data stream. It is no easy task to position the transducer exactly on the second file mark block in writing the second file data stream. Admittedly, this difficulty has been somehow overcome with open reel systems, but not with tape cassette systems. As far as we are aware, there have been no tape cassette systems built on the conventional principle of writing one file data stream after another.

We also know another conventional writing method that employs no file marks. The termination of one file data stream on magnetic tape is sensed according to this second known method when the transducer scans a predetermined length of blank tape portion following the last data block. This scheme is also objectionable because of its susceptibility to wrong operation under the influence of noise.

SUMMARY OF THE INVENTION

We have hereby invented how to write one file data stream after another on magnetic tape or like record media without the difficulties discussed above.

Briefly, our invention may be summarized as a method of writing two or more successive streams of file data on a record medium such as magnetic tape. Immediately after writing a first stream of file data in the form of a series of file data blocks on a desired record medium, at least one file mark block is created after the last file data block. Then, in writing a second stream of file data, a file mark cancel mark block is created next to the file mark block. Then the second stream of file data is written in the form of another series of file data blocks after the cancel mark block.

The cancel mark block hereby suggested contains a cancel mark indicative of the cancellation of the preceding file mark. Accordingly, the first and second streams of file data can be subsequently read one after the other despite the presence of the file mark therebetween. There is no need for positioning the transducer exactly on the file mark block in writing the second file data stream after the first file data stream.

The above and other features and advantages of our invention and the manner of realizing them will become more apparent, and the invention itself will best be understood, from a study of the following description and appended claim, with reference had to the attached drawings.

BRIEF DESCRIPTION OF THE DRAWINGS

FIG. 2A is a schematic diagram explanatory of how a first stream of file data is written on the magnetic tape in the apparatus of FIG. 1 by the prior art;

FIG. 2B is a diagram similar to FIG. 2A and explanatory of how a second stream of file data is written after the first stream of file data by the method of our invention;

FIG. 3 is a diagram similar to FIG. 2A but explanatory of a prior art method of writing the second stream of file data after the first stream of file data;

DETAILED DESCRIPTION

Figure 1:
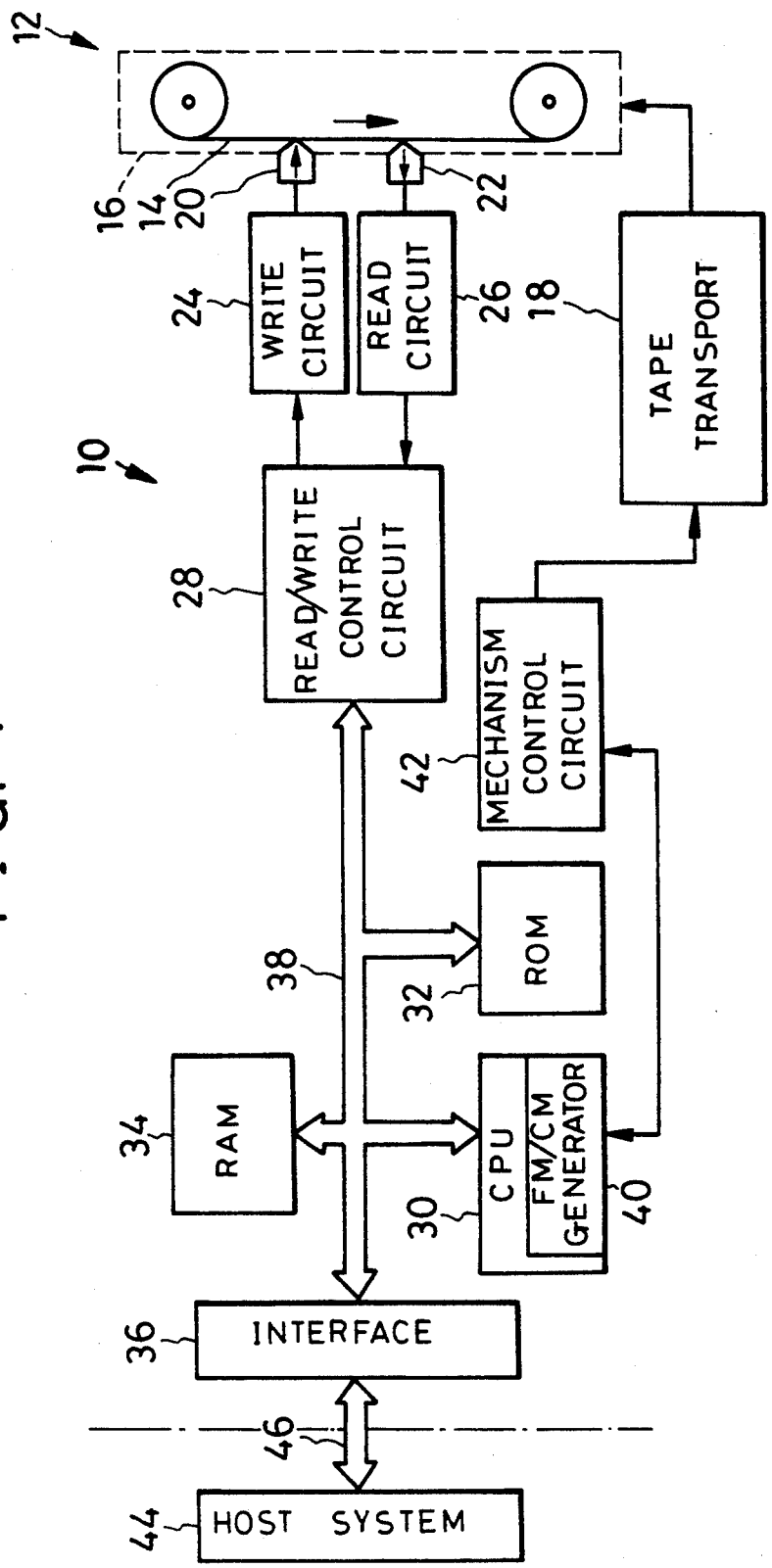
FIG. 1 is a block diagram of a magnetic tape cassette apparatus suitable for carrying out the method of our invention.

The writing method of our invention is perhaps best suited for practice with a digital magnetic tape cassette apparatus illustrated in FIG. 1 and therein generally designated 10. We will therefore first describe the construction of this apparatus 10 insofar as is necessary for a full understanding of our invention. Then we will proceed to the discussion of how one file data stream is written after another on the tape and of how that file data stream is read subsequently.

Tape Cassette Apparatus

The tape cassette apparatus 10 of FIG. 1 is for writing and reading digital data on a replaceable magnetic tape cassette 12 of standard construction having a length of magnetic tape 14 enclosed in a housing 16. The tape cassette 12 on being loaded in the apparatus 10 is operatively engaged with a tape transport 18 of any suitable design whereby the magnetic tape 14 is transported from hub to hub within the cassette housing 16.

Also included in the tape cassette apparatus 10 are a write transducer or head 20 and a read head 22, both arranged for data transfer contact with the magnetic tape 14 of the cassette 12 loaded in position within the apparatus. The write head 20 and the read head 22 are electrically connected to a write circuit 24 and a read circuit 26, respectively, and thence to a common read/write control circuit 28. The last mentioned circuit 28 controls the writing and reading of file data, as well as of file marks and cancel marks according to the method of our invention, on the magnetic tape 14.

The tape cassette apparatus 10 further comprises a central processor unit (CPU) 30, a read only memory (ROM) 32 preprogrammed for controlling the CPU, a random access memory (RAM) 34, and an interface 36. All these and the noted read/write control circuit 38 are interconnected by a bus system 38 as shown. The CPU 30 includes means 40 for generating a file mark signal and a cancel mark signal to be written on the magnetic tape 14. Also connected to the CPU 30 is a control circuit 42 which controls the operations of the tape transport 18 and other conventional electromechanical means, not shown, of the apparatus 10. The interface 36 is conventionally connected to a host system 44 via a host bus 46.

We have illustrated in FIG. 2A how the apparatus 10 records file data on the magnetic tape 14 of the tape cassette 12. As has been standardized in the art, each stream of file data is written on successive blocks on the tape 14 together with block addresses. We have designated the last three file data block addresses N−1, N and N+1. It is also the standard practice to write file marks FM on the two blocks, addressed N+2 and N+3, immediately following the last file data block N+1. It is understood that the tape 14 has an additional length left unrecorded after the two file marks FM.

FIG. 2B is explanatory of how another stream of file data is written on this blank length of the tape 14 by the method of our invention. A file mark cancel mark CM is first written on a block N+4 immediately following the second file mark block N+3. Then the additional stream of file data is written on the successive blocks N+5, N+6, etc., immediately following the cancel mark block N+4.

FIG. 3 illustrates by way of reference the conventional practice, set forth previously, of writing additional file data on the remaining blank length of the tape. The writing of the additional stream of file data was started at the second file mark block N+3. Therefore, as this second file mark block was overwritten, only the first file mark block N+2 was left to serve as a demarcation between the two succeeding streams of file data. We have already pointed out the inconveniences arising from this conventional practice.

Method of Writing

Figure 4:
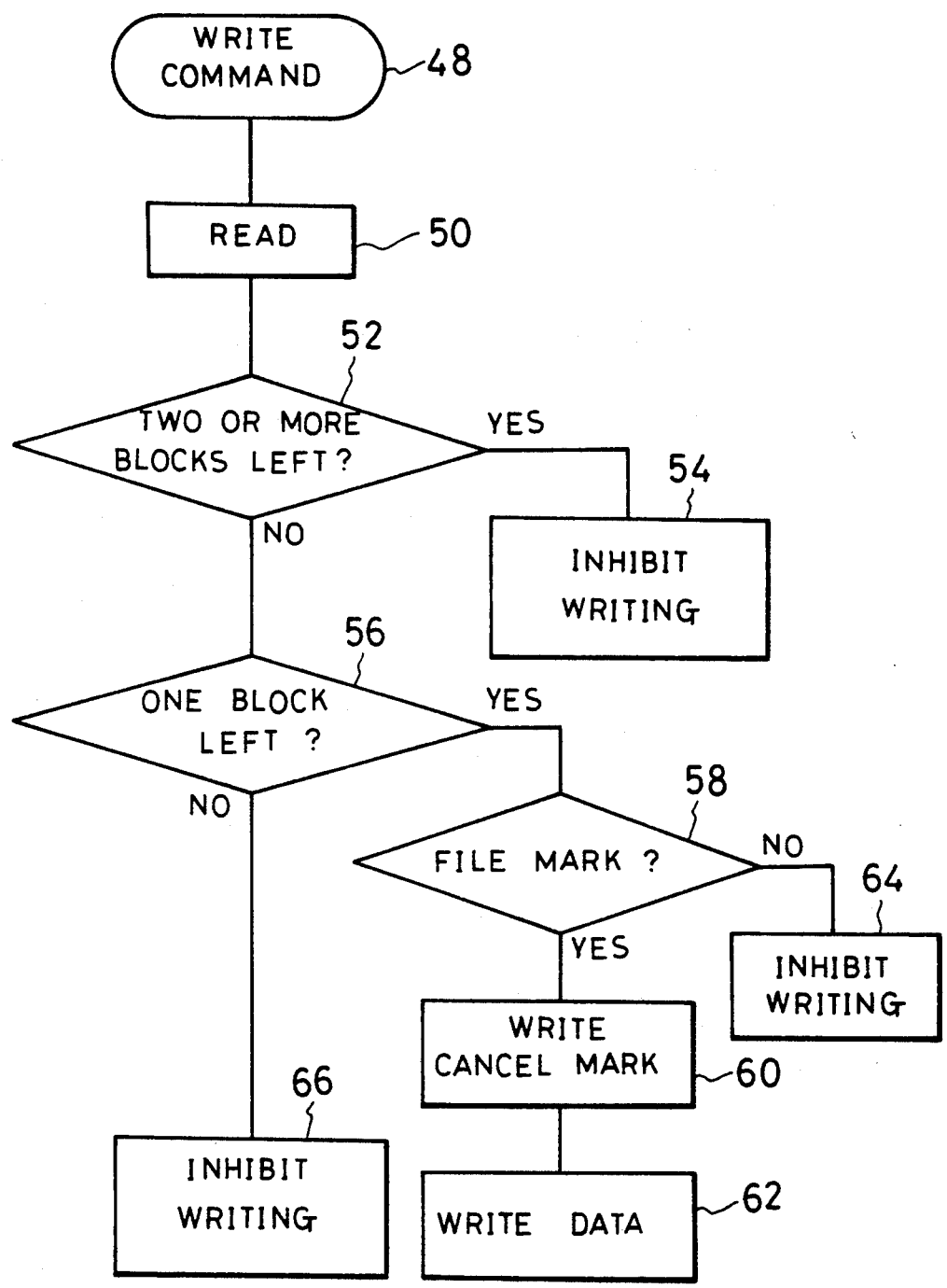
FIG. 4 is a flowchart explanatory of how the second stream of file data is written as shown in FIG. 2B.

We will now explain in more detail the actual steps involved in our method of writing additional file data on the tape 14 of the cassette 12 in the apparatus 10 of the FIG. 1 construction. Reference may be had to the flowchart of FIG. 4 for a better understanding of such explanation of our writing method.

The writing routine starts at 48 where the host system 44 delivers a write command to the CPU 30 of the tape cassette apparatus 10 via the interface 36. The CPU 30 is preprogrammed to respond to this write command at a block 50 by conditioning the apparatus 10 for a read mode. To this end the CPU 30 signals the read/write control circuit 28 and the mechanism control circuit 42 for the read mode. Retrieved from the magnetic tape 14 by the read head 22, the data will be sent to the RAM 34 via the read circuit 26 and the read/write control circuit 28.

Then, at a logical node 52, the CPU 30 determines whether or not there are two or more blocks left before the unrecorded region of the tape. The CPU 30 continues the inhibition of writing at a block 54 as long as the answer to the node 52 remains yes. When the answer becomes no, the CPU determines at the next logical node 56 whether or not there is only one block left. When the answer to the node 56 becomes yes, the CPU proceeds to determine at the subsequent logical node 58 whether that block is a data block or a file mark block. In the latter case a cancel mark is written after the two file mark blocks at a step 60. More specifically, the CPU 30 will generate a cancel mark signal and deliver it to the memory 34, from which the signal will be sent to the write head 20 thereby to be written on a cancel mark block N+4, FIG. 2B, immediately following the second file mark block N+3.

Then, at the next step 62, the desired new stream of file data will be written on the successive blocks N+5, N+6, . . . immediately after the cancel mark block N+4. As is conventional in the art, such new file data will be stored on the memory 34 before being sent to the write head 20.

Possibly, file data may be detected at the node 58 instead of a file mark. This possible fact means that no file mark has been recorded at the end of the old stream of file data. In that case the CPU inhibits the writing of the new file data at a block 64.

Another possible answer to the node 56 is no, meaning that no block is left before the unrecorded length of the tape, that is, that the head is positioned on the unrecorded tape length. In this case, too, the CPU inhibits the writing of the new file data at a block 66.

Figure 5:
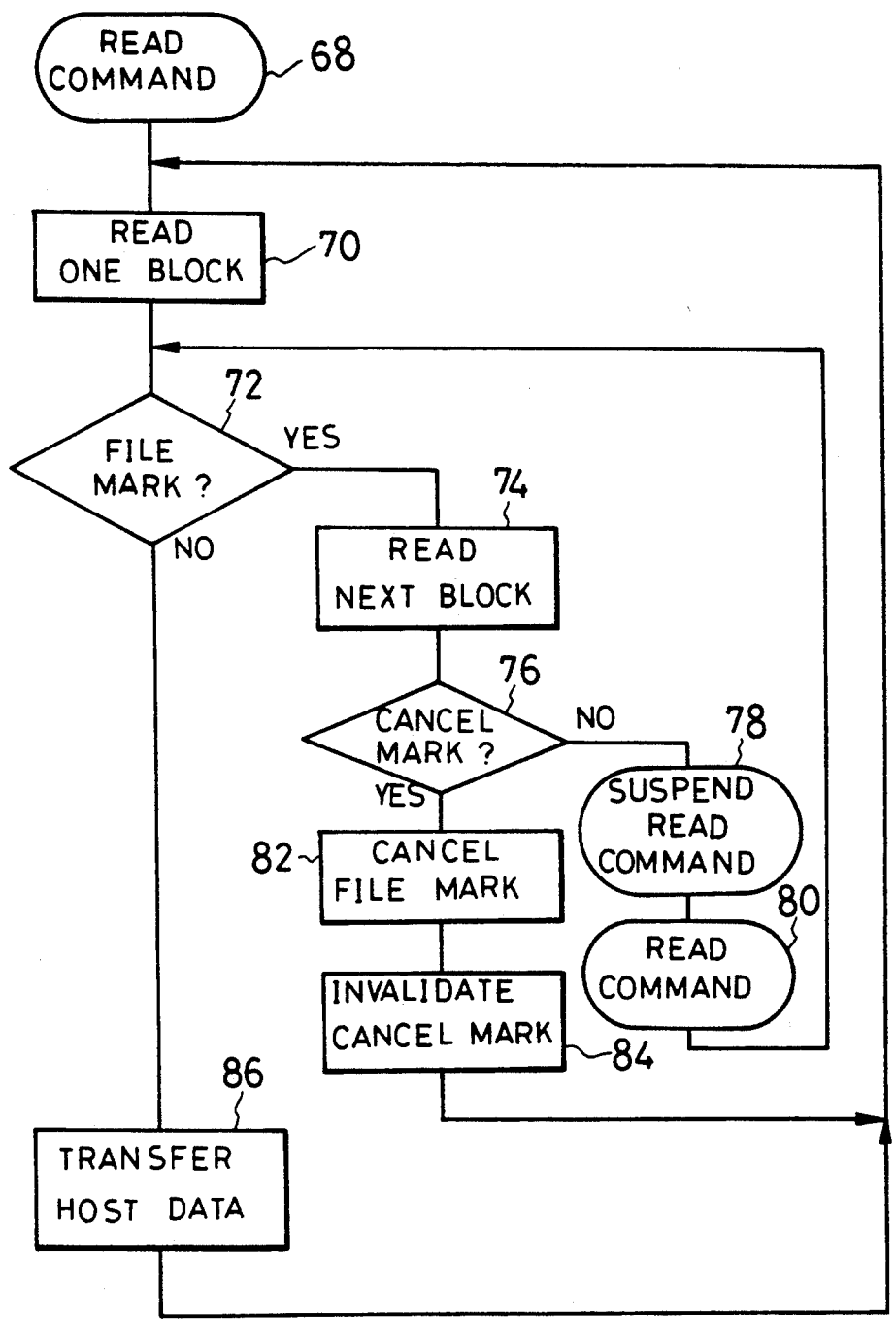
FIG. 5 is a flowchart explanatory of how the first and second streams of file data which have been written as shown in FIG. 2B are read.

We have flowcharted in FIG. 5 a method of reading the new file data stream that has been recorded on the tape 14 as shown in FIG. 2B. In response to a read command from the host system 44 at a step 68, the CPU causes at the next step 70 one block to be read from the tape.

Then, at a logical node 72, it is determined whether the block read at the step 70 is a file mark block or not. If it is, the next block is read at a step 74. Then it is determined at a logical node 76 whether this new block is a cancel mark block or not. If not, the read command of the step 68 is suspended at a step 78. Then a new read command is generated at a step 80 before returning to the node 72, at which it is ascertained if the next block contains a file mark.

The answer to the node 76 is yes when, as will be understood by referring to FIG. 2B again, a cancel mark is detected after two consecutive file marks. The next step 82 is file mark cancellation; that is, even if the block read at the step 70 contains a file mark, this mark is not taken as a sign of the end of one file data stream. Also, at a step 84, the detected cancel mark is invalidated, so that the host system is totally independent of the cancel mark suggested and used in accordance with our invention.

Then the first block N+5 of the desired stream of file data is read at the step 70. Since this data block contains no file mark, the answer to the node 72 is no. The transfer of host data is effected at a step 86. Then the read routine returns to the step 70 for reading the next file data block.

We have disclosed in the foregoing how one file data stream is written after another on the tape 14 without deleting a file mark, and how the second file data stream is read without affecting the host system by the cancel mark hereby proposed. Thus we have succeeded in overcoming the noted inconveniences heretofore encountered in the art.

Possible Modifications

Despite the foregoing detailed disclosure we do not wish our invention to be limited by the exact details of such disclosure. The following, then, is a brief list of possible modifications, alterations and adaptations which we believe all fall within the scope of our invention:

1. The creation of two consecutive file mark blocks after each file data stream is no prerequisite in the practice of our invention; instead, only one, or three or more file mark blocks may be provided as required or desired.

2. Two or more, instead of one, cancel mark blocks could be created consecutively before each new file data stream.

3. A combined read/write head could be employed in place of separate write head and read head.

4. The writing method of our invention may be applied not only to magnetic tape cassettes but also to a variety of other record media notably including magnetic or optical disks.

What we claim is:

1. A method of writing two or more successive streams of file data on a record medium, which comprises:
   (a) writing a first stream of file data in the form of a series of file data blocks on a record medium;
   (b) writing at least one file mark on a file mark block following a last file data block of the first stream of file data, the file mark being written immediately after the writing of the first stream of file data and serving to inform a host system of the end of one file data stream;
   (c) writing, preparatory to the writing of a second stream of file data, a file mark cancel mark on a cancel mark block following the file mark block, the cancel mark indicating the cancellation of the file mark; and
   (d) writing the second stream of file data in the form of a series of file data blocks following the cancel mark block.

2. An apparatus for use with a host system for writing two or more successive streams of file data on a record medium, comprising:
   (a) means for writing a first stream of file data in the form of a series of file data blocks on a record medium;
   (b) means for writing at least one file mark on a file mark block following a last file data block of the first stream of file data, the file mark being written immediately after the writing of the first stream of file data and serving to inform said host system of the end of one file data stream;
   (c) means for writing, preparatory to the writing of a second stream of file data, a file mark cancel mark on a cancel mark block following the file mark block, the cancel mark indicating the cancellation of the file mark; and
   (d) means for writing the second stream of file data in the form of a series of file data blocks following the cancel mark block.

3. A method as recited in claim 1, wherein said record medium comprises a magnetic cassette tape.

4. An apparatus as recited in claim 2, wherein said record medium comprises a magnetic cassette tape.

* * * * *